United States Patent
Ozaki et al.

(10) Patent No.: US 6,289,423 B1
(45) Date of Patent: *Sep. 11, 2001

(54) METHOD AND APPARATUS FOR PROVIDING SELECTIVE WRITE PROTECT REGIONS IN A STORAGE MEDIUM

(75) Inventors: Koji Ozaki, Osaka; Yasumasa Yoshida, Kobe, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,978

(22) Filed: Nov. 25, 1997

(30) Foreign Application Priority Data

Dec. 9, 1996 (JP) .................................... 8-328419

(51) Int. Cl.⁷ ................................ G06F 12/00; G11B 7/24
(52) U.S. Cl. ......................... 711/163; 711/161; 711/102; 369/275.3
(58) Field of Search ..................... 711/100, 163, 711/101, 104, 103, 102, 154, 161, 162; 714/13, 10; 369/275.3; 360/8; 710/68

(56) References Cited

U.S. PATENT DOCUMENTS

| | | | |
|---|---|---|---|
| 5,056,009 | * 10/1991 | Mizuta ............................. | 711/163 |
| 5,524,205 | * 6/1996 | Lomet et al. ..................... | 714/16 |
| 5,774,742 | * 6/1998 | Nakamura et al. ............... | 710/8 |
| 5,799,141 | * 8/1998 | Galipeau et al. ................. | 714/13 |
| 5,805,932 | * 9/1998 | Kawashima et al. ............. | 710/68 |
| 5,813,010 | * 9/1998 | Kurano et al. .................... | 707/100 |
| 5,832,088 | * 11/1998 | Nakajima et al. ................ | 380/22 |
| 5,878,020 | * 3/1999 | Takahashi ......................... | 369/275.3 |
| 5,881,287 | * 3/1999 | Mast .................................. | 395/701 |
| 5,894,588 | * 4/1999 | Kawashima et al. ............. | 360/8 |
| 5,930,825 | * 7/1999 | Nakashima et al. .............. | 711/163 |

* cited by examiner

Primary Examiner—B. James Peikari
Assistant Examiner—Brian R. Peugh
(74) Attorney, Agent, or Firm—Greer, Burns & Crain, Ltd.

(57) ABSTRACT

A method and apparatus to control copying of a group of data stored in an original information-storing medium into a destination information-storing medium. The method includes a step of reading attribute information of a first zone storing the group of data, where the attribute information indicates whether the zone is a ROM area or a RAM area, and a step of copying the attribute information to a second zone to which the group of data is to be copied. The method further includes a step of copying the group of data stored in the said first zone in the original information-storing medium to the second zone in the destination information-storing medium.

18 Claims, 9 Drawing Sheets

(1ST PREFERRED EMBODIMENT)

(2ND PREFERRED EMBODIMENT)

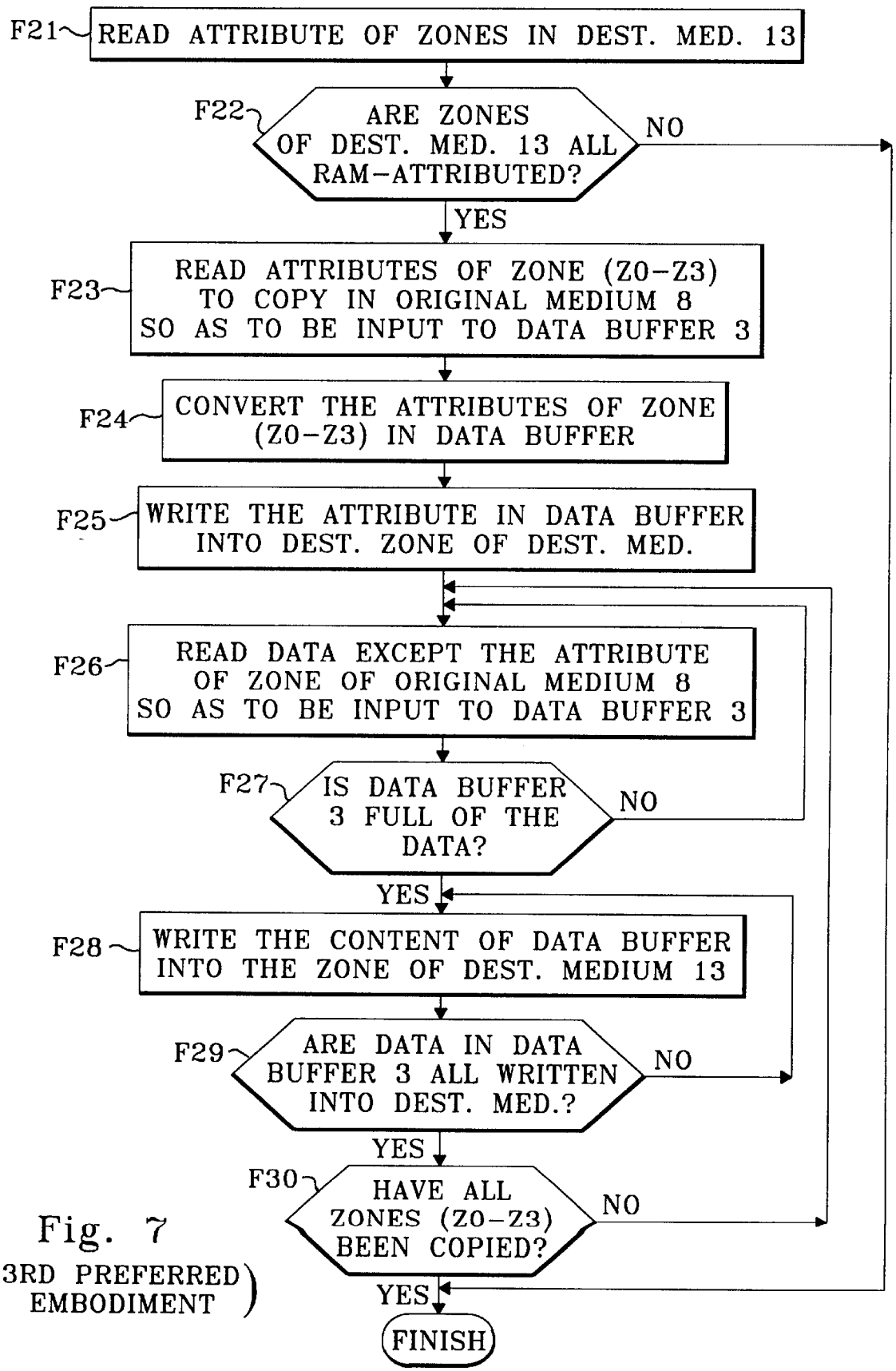
Fig. 7 (3RD PREFERRED EMBODIMENT)

METHOD AND APPARATUS FOR PROVIDING SELECTIVE WRITE PROTECT REGIONS IN A STORAGE MEDIUM

BACKGROUND OF THE INVENTION

1. Field of the Invention

This invention relates to a method and an apparatus to control copying of data on a recording medium, such as magneto-optical disks and magnetic disks, etc.

2. Description of the Related Arts

As the recent progress of the computer system, there have been enhancements in the data capacity to be handled and in the variety of the data storing medium. Particularly in storing information including system files or system data which will not require future amendment there are many cases of employing a full-ROM, an abbreviation of Read-Only Memory, that is exclusively for being "read-out the data" throughout the areas of the medium, such as a CD-ROM, an abbreviation of Compact Disk ROM, which is hereinafter referred to as an F-ROM medium, or employing a partial ROM medium of a magneto-optical disk, referred to hereinafter as a P-ROM, that includes both an area readable as well as writable and an area readable-only.

Figure 13:
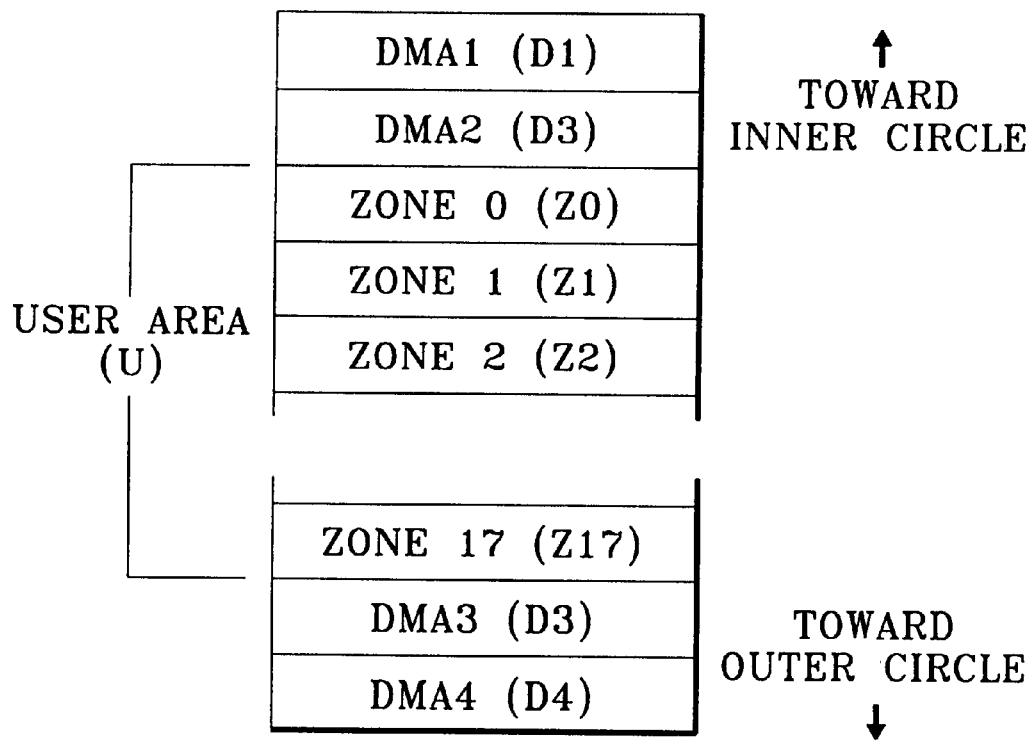

FIG. 13 schematically illustrates a structure of a 540 MB magneto-optical medium specified by ISO, the International Standardizing Organization. The magneto-optical medium is provided with a user area U and Defect Management Areas DMA1 (D1)–DMA (D4). Prior to and after the user area U are respectively two areas of the DMAs. The user area is accessable from the user and is divided into eighteen zones from zone 0 (Z0)–zone 17 (Z17). The read/write operations are performed from the inner circle to the outer circle of the magneto-optical disk while the disk is rotating at a constant rotation speed. Therefore, the reading/writing frequency is required to be changable. Accordingly, the sector number in the physical tracks are different for each zone.

The above-cited DMA1 (D1)–DMA (D4) are stored with a Disk Definition Structure, referred to hereinafter as a DDS, includes information regarding the quantity of zones, attribute information of each zone to indicate whether it is physically writable, i.e. whether the zone is a ROM area or a RAM area, a Primary Defect List, referred to hereinafter as a PDL, in which are registered defect information, and a Secondary Defect List, referred to hereinafter as a SDL.

A magneto-optical disk that is called a CD-R is a CD capable of being written-in is different from the CD-ROM in that the attributes are also specified in the destination disk according to the information given from the original medium. Another magneto-optical disk that have been called a DVD-ROM/DVD-RAM and has a bright future is also such that the attributes are distinguished by zone in the destination disk.

Figure 10:
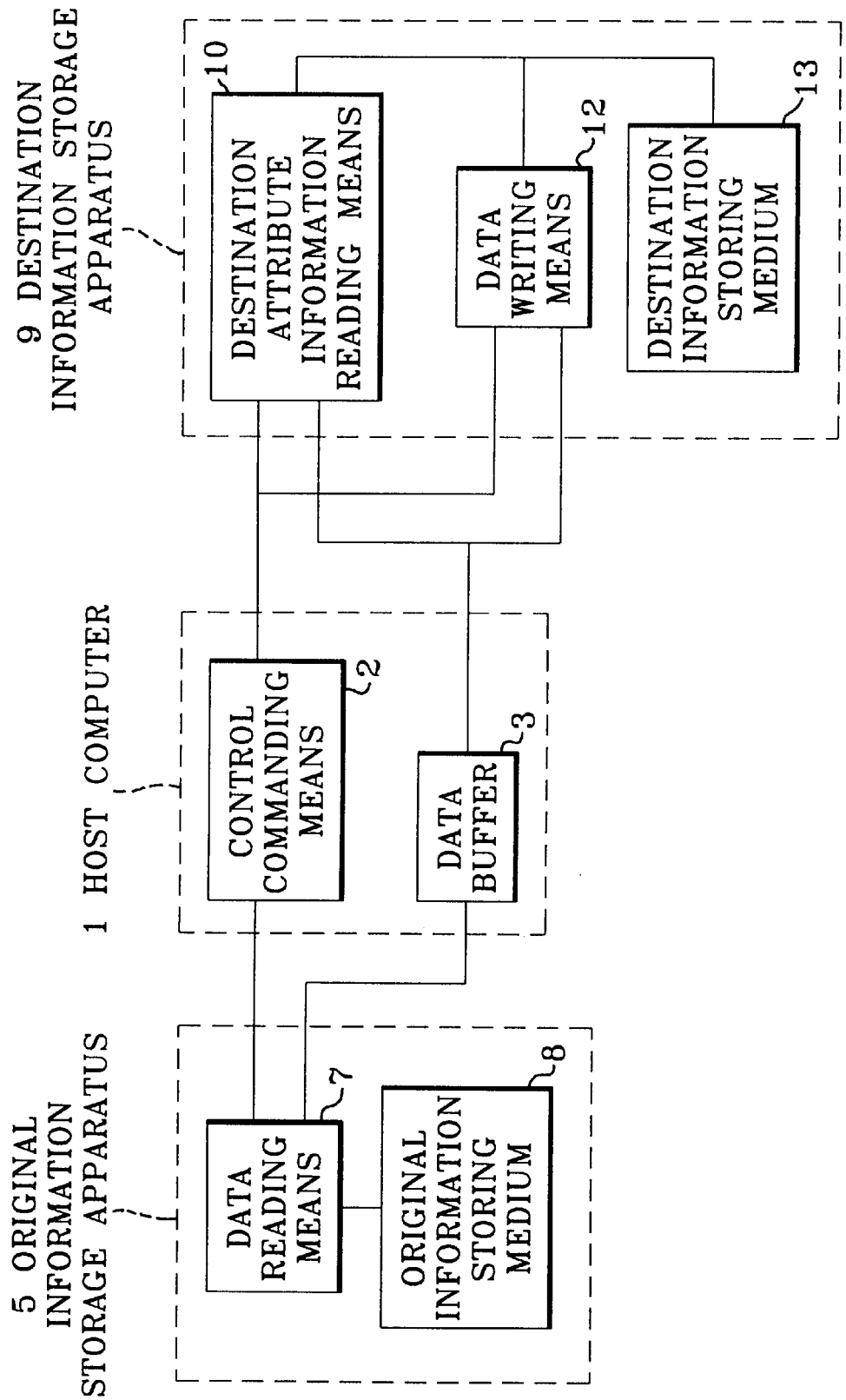
Figure 11:
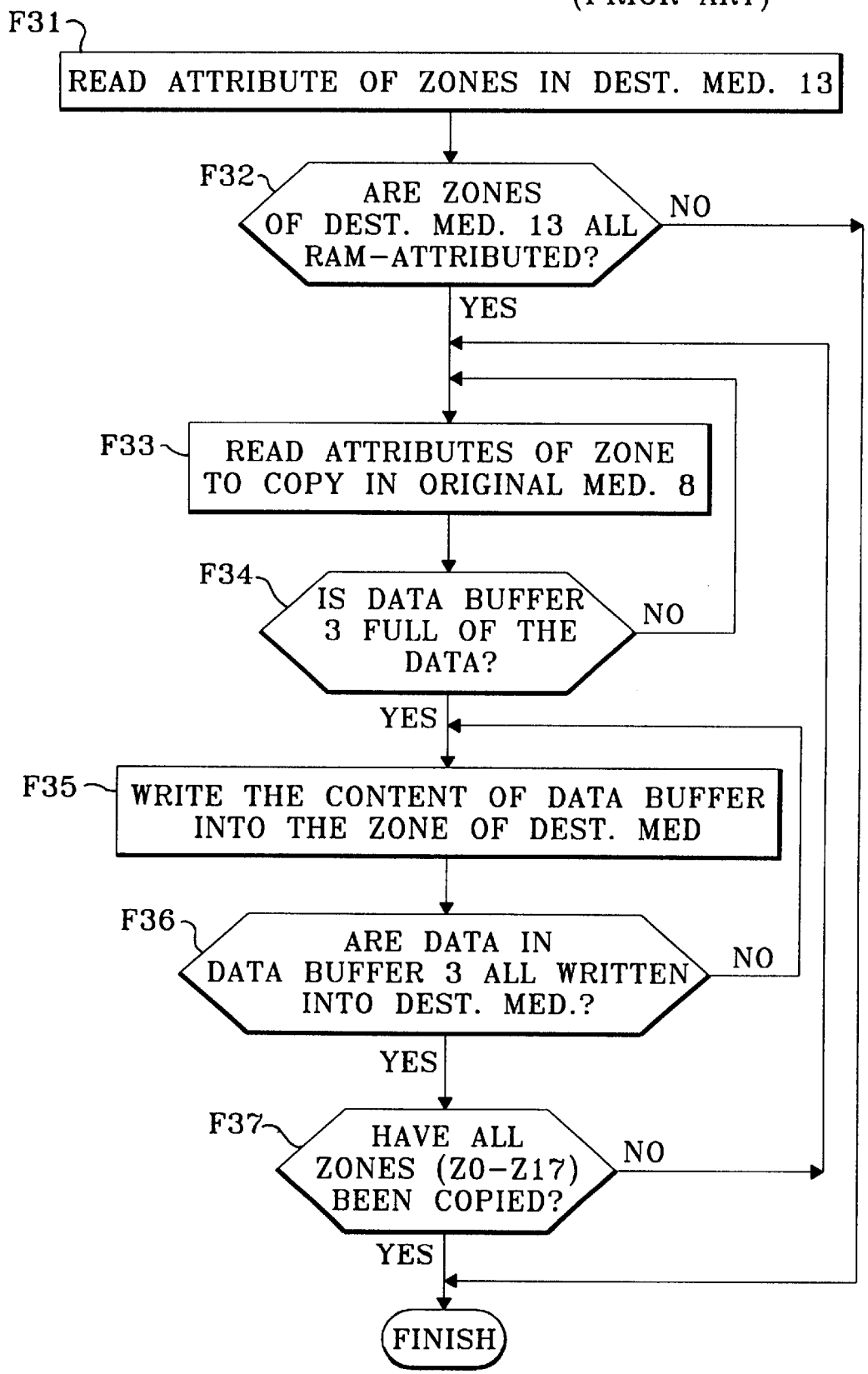

Hereinafter is described a prior art method and apparatus for controlling copying of the information storing medium. FIG. 10 is a block diagram of the prior art information storing medium. FIG. 11 is a flow chart illustrating the operation procedure thereof.

An original information storage apparatus 5 includes an original information-storing medium 8 typically formed of a magneto-optical disk which stores the data to be copied, which is accordingly referred to hereinafter as an original medium. The original medium 8 typically formed of a magneto-optical disk partially includes ROM-attributed zones (Z0–Z5).

A destination information storage apparatus 9 includes a destination information-storing medium 13 typically formed of a magneto-optical disk 9 to copy the data of the original information storing medium, Destination information storage apparatus 9 has its entire zones, for example, (Z0–Z17) as RAM that is readable as well as writable, which will be referred to hereinafter as F-RAM medium, an abbreviation of Full RAM, and a destination medium. In the ROM-attributed zone in P-ROM medium are generally stored system files and system data of an application program so that no damage of the data, etc. is caused from an erroneous operation of the operator.

Control commanding means 2 installed in a host computer 1 connected to both the storage apparatuses 5 and 9 instructs destination attribute information reading means 10 installed in destination information storage apparatus 9 to read out the attribute information of each zone stored in the DDS of the destination information-storing medium 13; and destination attribute information reading means 10 reads the attribute information of the destination information-storing medium 13. Thus read attribute information is then transferred to a data buffer 3 of host computer 1 (F31 shown in FIG. 11). Then, the attributes of the entire zones of the destination F-RAM are checked whether they are all of RAM-attributed, i.e. is writable, by host computer 1 (F32). If it is ROM-attributed indicating that the writing therein is prohibited, no copying operation is executed so as to terminate.

Next, the control commanding means 2 instructs data reading means 7 to read the information, referred to hereinafter as data, in user area U of original information-storing medium 8. The data reading means 7 sequentially reads the data out of zone 0 (Z0) of original P-ROM medium 8, then the data is transferred to data buffer 3 (F33). The reading operation of the data is continuously repeated until data buffer 3 reaches its capacity limit. Upon reaching the capacity limit the control commanding means 2 instructs data writing means 12 to write the data of data buffer 3 (F34). Data writing means 12 writes the data of data buffer 3 into the destination F-RAM medium (F35). Upon completion of the data writing of the data of data buffer 3 the remaining data is read out so as to be written in, in the similar way. This reading/writing sequence is continuously repeated until the data in the entire zones (Z0–Z17) of the original medium is read out and written into the destination medium (F33–F36). Upon completion of the writing-in the copying operation is finished (F37).

The attributes of zones of the destination F-RAM medium corresponding to the ROM-attributed zones (Z0 to Z5) of the original P-ROM medium are writable in the prior art. Therefore, if the operator erroneously writes over the written data after the data is copied to the destination information-storing medium 13 there is a possibility of damaging the precious data, such as system files or system data; in other words, there is no way to surely prevent the data damage of the destination information storing medium 13 after copying the medium thereto.

It is possible to prohibit the writing into the entire medium by a write-protect switch provided in the information-storing medium; however it is impossible to protect only a part of information-storing medium.

SUMMARY OF THE INVENTION

It is a general object of the invention to provide a method and a copying apparatus which are able to certainly protect data in a destination information storing medium, typically a magneto-optical disk, from its damage.

In copying a group of data stored in an original information-storing medium into a destination information-storing medium, an attribute indicating whether the area storing the group is ROM area or RAM area, in the original information-storing medium, is copied to an area to which the group of data is to be copied in the destination information storing medium, and the data excluding the above-attribute of the group are successively copied to said area in the destination information-storing.

The original and destination information storing media are typically a magneto-optical disk.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

Figure 1:
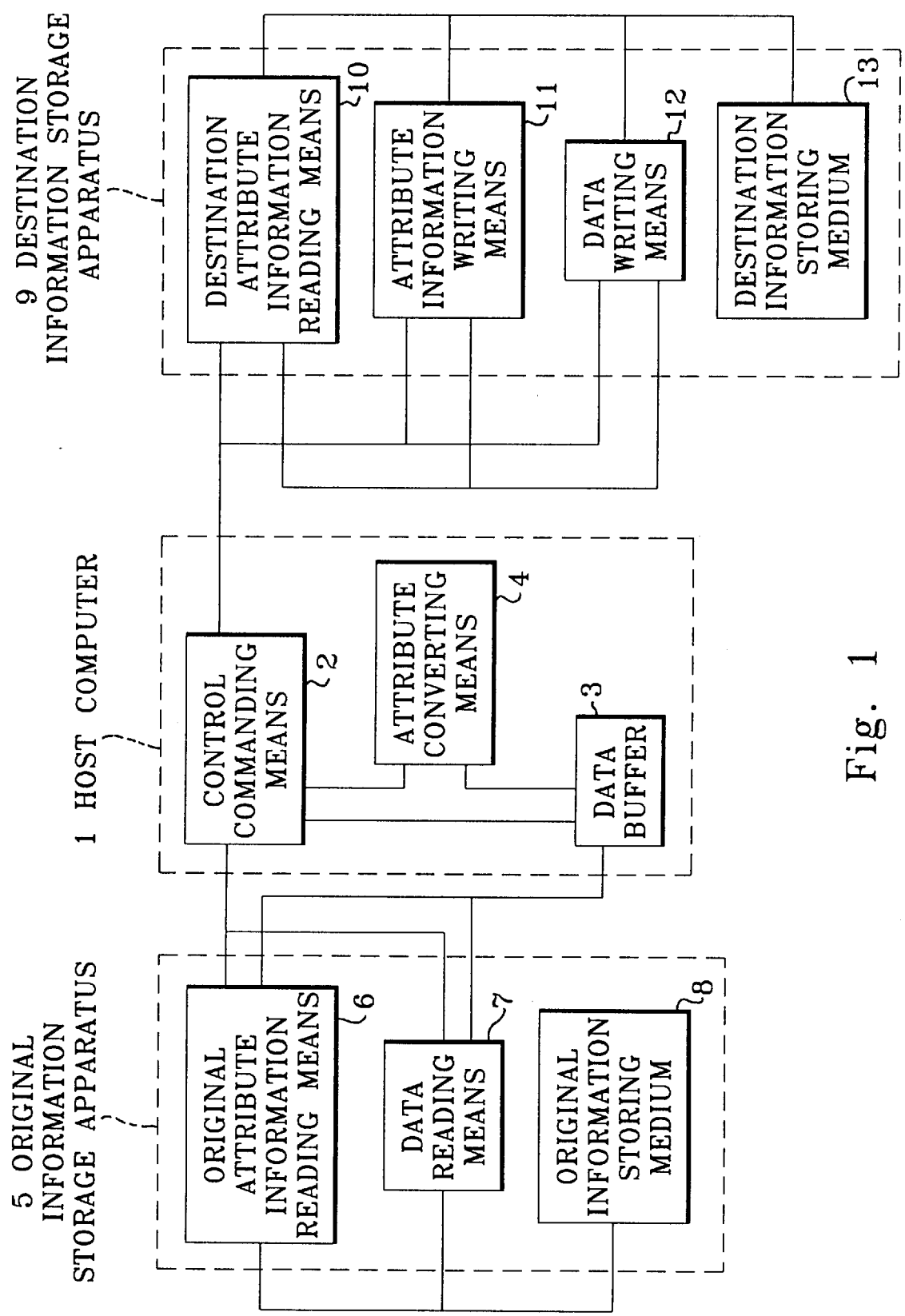
Figure 2:
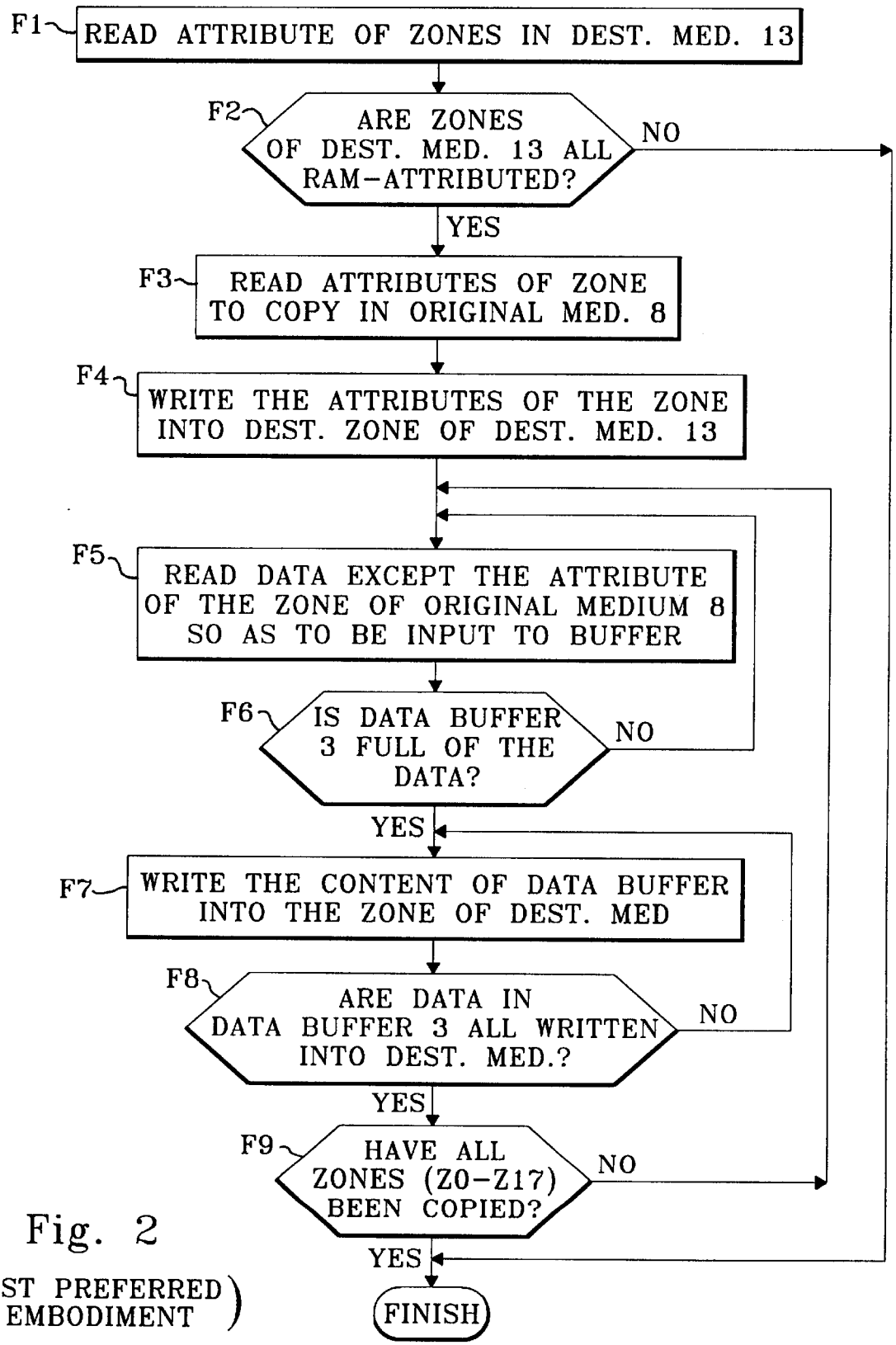
Figure 3:
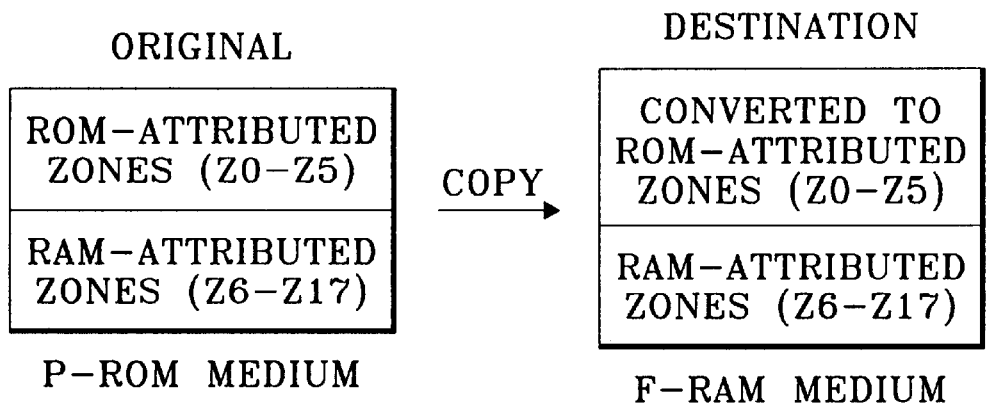
Figure 4:
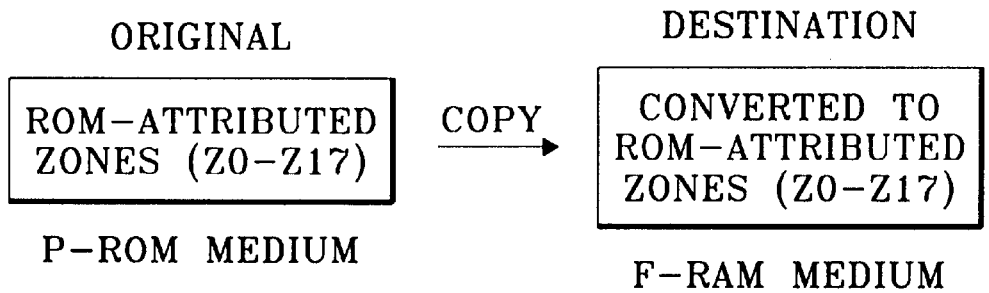
Figure 6:
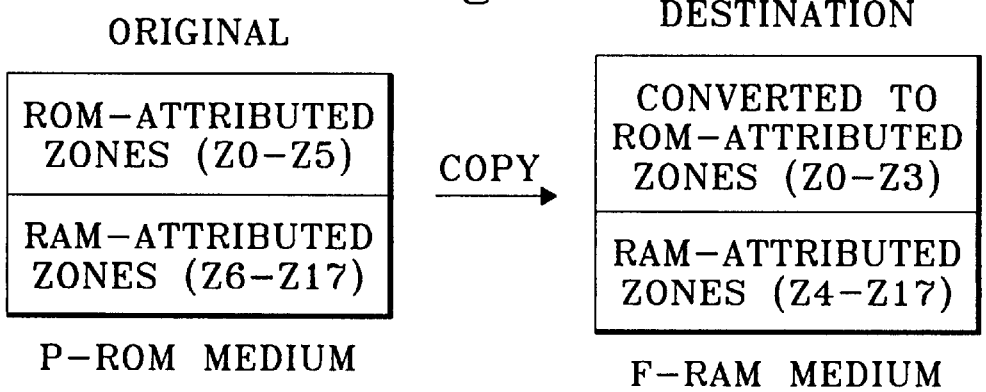
Figure 5:
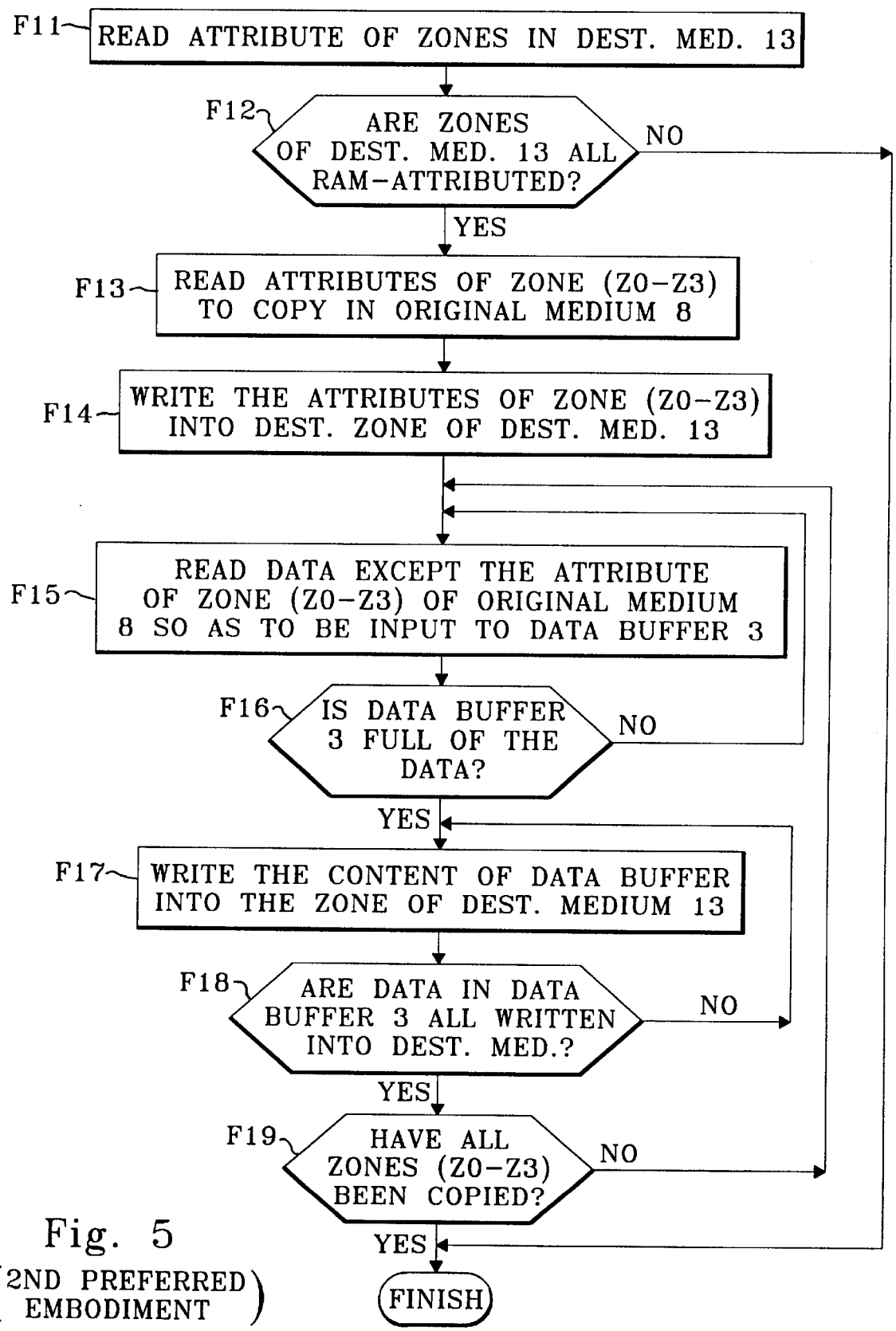
Figure 8:
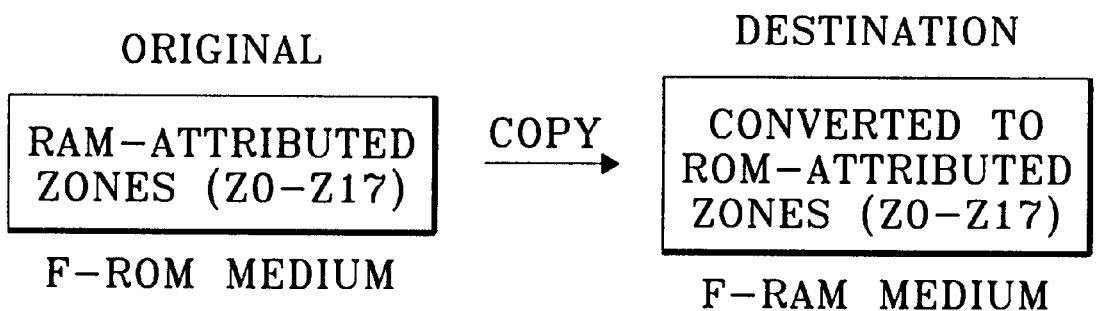
Figure 9:
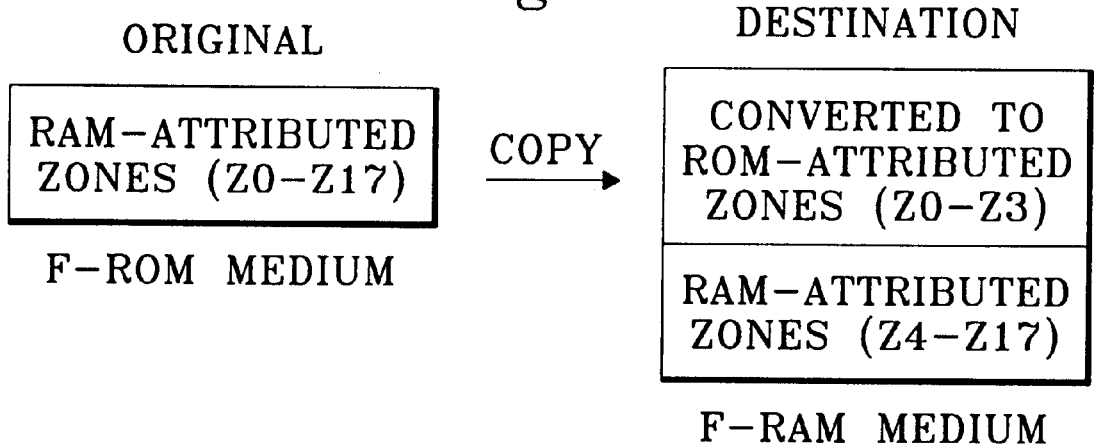
Figure 12:
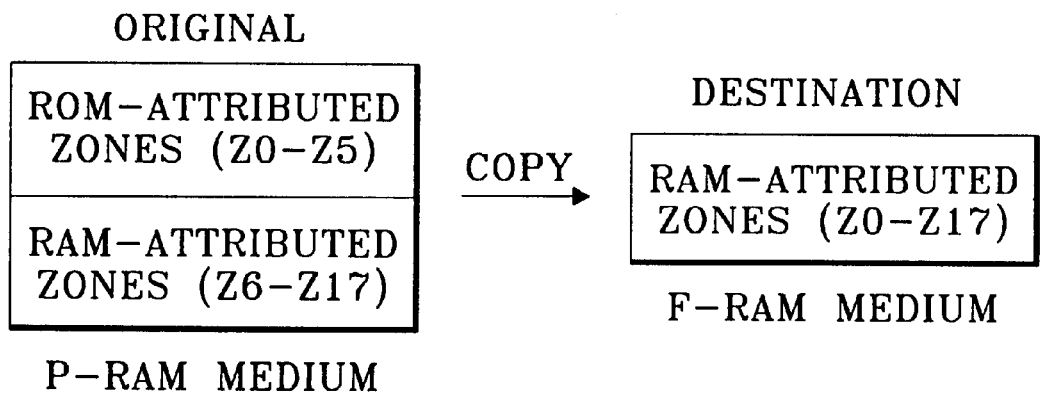

FIG. 1 schematically illustrates a block diagram constituting a first preferred embodiment of the present inventions;

FIG. 2 is a flow chart schematically illustrating the method of the first preferred embodiment of the present invention;

FIG. 3 schematically illustrates a principle of the attributes of the original information storing medium and a destination information storing medium according to the first preferred embodiment of the present invention;

FIG. 4 schematically illustrates the principle of the attributes of the original information storing medium and the destination information storing medium of a modification of the first preferred embodiment;

FIG. 5 schematically illustrates a flow chart of the second preferred embodiment of the present invention;

FIG. 6 schematically illustrates a principle of the attributes of the original information-storing medium and a destination information-storing medium according to the second preferred embodiment of the present invention;

FIG. 7 schematically illustrates a flow chart of the third preferred embodiment of the present invention;

FIG. 8 schematically illustrates a principle of the attributes of the original information storing medium and a destination information-storing medium according to the third preferred embodiment of the present invention;

FIG. 9 schematically illustrates a principle of the attributes of the original information-storing medium and a destination information-storing medium according to the fourth preferred embodiment of the present invention;

FIG. 10 schematically illustrates a block diagram of a prior art method;

FIG. 11 schematically illustrates a flow chart of the prior art method;

FIG. 12 schematically illustrates a prior art principle of the attributes of the original information-storing medium and a destination information-storing medium; and FIG. 13 schematically illustrates a structure of a 540 MB magneto-optical disk.

DESCRIPTION OF THE PREFERRED EMBODIMENT

Referring to FIGS. 1 and 2, respectively illustrating a bock diagram and a flow chart, hereinafter is described a first preferred embodiment of the present invention where the entire zones (Z0 to Z17) are to be copied.

An original information storage apparatus 5 includes an original information-storing medium 8, which may be referred to hereinafter as an original medium, and data reading means 7 for reading out the data stored in the original information-storing medium 8. Original medium 8 is typically formed of a magneto-optical disk, and partially includes ROM zones, for example, (Z0 to Z5). Accordingly, original information-storing medium 8 is called a P-ROM. In the destination information storage apparatus 9 is installed a destination information-storing medium 13 in which all the zones (Z0 to Z17) are fully RAM-attributed; accordingly is called an F-RAM.

Control commanding means 2 installed in a host computer 1 connected to both the original and destination storage apparatuses 5 and 9 instructs the attribute information reading means 10 in the destination information storage apparatus 9 to read out the attribute information of the destination information storing medium 13; then attribute information reading means 10 reads the attribute information of the zones in the destination information storing medium 13, which is then transferred to a data buffer 3 of host computer 1 (F1). Then, the attribute of the entire zones (Z0–Z17) of the destination F-RAM are checked whether all RAM-attributed or not by host computer 1. If it is ROM-attributed indicating that the writing thereto is prohibited, the copying operation is not executed so as to terminate (F2). The above procedures are identical to those of the prior art procedures.

Next, the control commanding means 2 instructs an original attribute information reading means 6 provided in original information storage apparatus 5 to read out the attribute information of a group of data stored in a zone in the original information-storing medium 8; then the original attribute information reading means 6 reads the attribute information of the zone to copy in the original information storing medium 8, which information is then transferred to data buffer 3 (F3).

Next, control commanding means 2 instructs an attribute information writing means 11 provided in destination storage apparatus 9 to write the read-out original attribute information to the destination F-RAM. Then, the attribute information, writing means 11 writes the attribution information of the zone storing the data to be copied in data buffer 3 into a zone to which the data is to be copied in the destination F-RAM medium (F4).

Next, control commanding means 2 instructs data reading means 7 installed in original storage apparatus 5 to read the data stored in the above-mentioned zone in original information storing medium 8. Data reading means 7 reads the data without attributes successively from zone 0 (Z0) of original P-ROM medium, which data is then transferred to data buffer 3 (F5). The reading operation is kept on until the data butter 3 reaches its capacity limit. Upon reaching the capacity limit of the data buffer 3, control commanding means 2 instructs a data writing means 12 provided in destination storage apparatus 9 to write the data stored in data buffer 3 (F6) into the destination medium. The data, except the attribute information, stored in data buffer 3 is written by data writing means 12 into the above-mentioned zone to which the data is to be copied in the destination F-RAM medium 13 (F7). Upon completion of the writing of the data of data buffer 3, the rest of the original data are successively read-out and written-in in the same way. This sequence of reading and writing operations are continued until all the data of the entire original zones (Z0 to Z17) are finally written into the destination F-RAM medium 13 (F5 to F8). Upon completion of the writings, the copying is finished (F9).

As shown in FIG. 3, ROM attributes are thus given to the zone of destination F-RAM in accordance with ROM zones (Z0–Z5) of original P-ROM medium so as to indicate an inhibition of writing thereto.

Though the case where the original medium is a P-ROM is described above, the present invention can be similarly embodied in the case where the original medium is an F-ROM medium. In this case, the zone attributes of destination F-RAM medium are given ROM attributes indicating an inhibition of writing thereto for all the zones (Z0 to Z17), as shown in FIG. 4.

Hereinafter is described, referring to FIGS. 1 and 5, the second preferred embodiment of the present invention, where zones (Z0 to Z3) partially among ROM attribute zones (Z0 to Z5) of the original P-ROM medium of the above first preferred embodiment are to be copied. An original information-storing medium 8 is installed in the original storage apparatus 5. The original information- storing medium 8 is a P-ROM medium typically of a magneto-optical disk partially comprising ROM-attributed zones (Z0 to Z5) therein. Destination information storing medium 13 is installed in the destination storage apparatus 9. Destination information storing 4 medium 13 is an F-RAM medium typically of a magneto-optical disk whose entire zones (Z0 to Z17) are RAM-attributed.

Similar to the first preferred embodiment, it is checked whether zones (Z0 to Z17) of the destination F-RAM medium are all RAM-attributed, that is writable If they are found ROM-attributed to prohibit to write thereto, no copying operation is performed so as to terminate the copying operation (F11, F12).

Next, the control commanding means 2 instructs original attribute information reading means 6 provided in original storage apparatus 5 to read the attribute information of original information-storing medium 8; then the original attribute information reading means 6 reads the attribute information of the zone in which the data to be copied is stored in the original information storing medium 8, which information is then transferred to data buffer 3 (F13).

Next, control commanding means 2 instructs an attribute information writing means 11 provided in destination storing means 5 to write thus read-out original attribute information; then, attribute information writing means 11 writes the attribution information stored in data buffer 3 into a zone to which the data is to be copied in destination F-RAM medium (F4). The subsequent data copying operation is identical to the controls in the first preferred embodiment (F15 to F19). Thus, the attributes of the zones of the destination F-RAM medium corresponding to the original ROM-attributed zones (Z0 to Z3) from which the original P-ROM medium is copied are copied with the ROM attributes, as shown in FIG. 6.

Though in the above preferred embodiments is described the case where the original medium is a P-ROM medium; however, the original medium can similarly be an F-ROM medium.

Though in the above preferred embodiments is described the case where the destination medium is of an F-RAM, the destination medium can be of a P-ROM medium causing no problem as long as the capacity of the RAM-attributed zone is adequate for the copying operation.

A third preferred embodiment of the present invention is hereinafter described referring to FIGS. 1 and 7, where the original RAM-attributed zones are converted to ROM-attributed zones in the copying operation. Original information storage apparatus 5 is provided with an original information-storing medium 8. Original information-storing medium 8 is an F-RAM whose entire zones (Z0 to Z17) are RAM-attributed. Destination information storage apparatus 9 is provided with a destination information-storing medium 13. Destination information storing-medium 13 are an F-RAM medium whose entire zones are RAM-attributed similar to the above preferred embodiments.

Similar to the above preferred embodiments, the host computer 1 checks whether the attributes of all the zones (Z0 to Z17) of the destination F-RAM medium are all RAM-attributed. If they are found to be ROM-attributed inhibiting to write therein, the copying operation is terminated without being executed (F21, F22).

Next, the control commanding means 2 instructs an attribute information reading means 6 provided in original storage apparatus 5 to read out the attribute information of original information storing medium 8; then the original attribute information reading means 6 reads the attribute information of a zone storing the data to be copied in the original information-storing medium 8 (F13), which information is then transferred to data buffer 3. Then, according to information instructed in advance by an operator the control commanding means 2 instructs an attribute information converting means 4 to covert the attribute information. Attribute information converting means 4 converts the attribute information of the entire zones (Z0 to Z17) thus read-out and stored in buffer 3, from RAM attributes to ROM attributes (F24).

Then, control commanding means 2 instructs an attribute information writing means 11 provided in destination information storage apparatus 9, to write thus converted attribute information. Attribute information writing means 11 writes the attribute information stored in data buffer 3 into F-RAM medium 13 (F25). The subsequent copying operations are identical to those of the above preferred embodiments (F26 to F30).

Accordingly, the zone attribute of the destination F-RAM is converted to ROM attributes upon requirement even if the original medium is an F-RAM medium, as shown in FIG. 8.

In a fourth preferred embodiment, such a copying operation is also possible that the attributes of only specific zones (Z0 to Z3) are converted to ROM attributes and the rest zones (Z4 to Z17) are copied as RAM attributes. In this case, the zone attributes in the destination F-RAM-attributed medium, which have copied the original F-RAM attributed medium corresponding to the F-RAM attributed zones (Z0 to Z3), are converted to ROM attributes that prohibit to be written-in as shown in FIG. 9.

According to the above-described preferred embodiments of the present invention, the writing-in to the copied information-storing medium can be prohibited to be written in; accordingly, there can be no possibility to erroneously damage the precious files or data, such as system files or system data, even if the operator erroneously operate the machine after the data, etc. is copied from the original information-storing medium to the destination information-storing medium. Thus, the copied data in the destination storing medium can be certainly protected from being damaged.

As the increase in the medium capacity, there are stored a plurality of various application programs within a single medium; and further, in the application program are stored a mixture of a system data to be read out important in activating the application program and a data to be revised, i.e. to be read-out and written-in, as a work area of the application program. Accordingly, there have been increasing the cases where the attributes are grouped by a zone. For example, the cases are that in the ROM zone are stored a common data such as a word processor program, while in the RAM zone are stored a dictionary data and a document data. In copying such a medium in the prior art method, if the original is a RAM medium the data is copied as a RAM-attributed data. Accordingly, thus copied precise data can be easily damaged by an erroneous operation of the operator. However, the present invention prevents such a problem.

Though in the above preferred embodiments the cases employing a magneto-optical disk are referred to, it is apparent that the present invention can be embodied in other disks, such as a CD-R, an abbreviation of CD-Recordable which allows a recording once-only, a PD, an abbreviation of Phase-change disk, in which the recording carried out by the use of the phase change, and DVD-RAM, an abbreviation of Digital Video Disk RAM or Digital Versatile Disk RAM.

The many features and advantages of the invention are apparent from the detailed and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

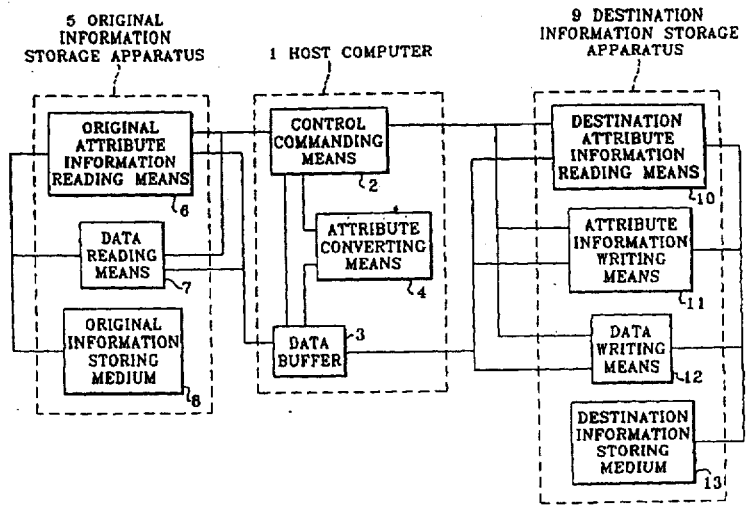

What I claim is:

1. A method to prevent inadvertent overwriting of a group of data copied from an original information-storing medium into a destination information-storing medium, each of these information-storing media having a disk for storing information, comprising the steps of:

reading out attribute information of at least one first zone storing the group of data, said first zone being in the original information-storing medium, said attribute information indicating whether said first zone is a ROM area or a RAM area and said attribute information being provided in an area out of a user area, wherein at least one of said first zones in the original information-storing medium has said attribute information indicating a ROM area;

copying said attribute information to a second zone to which the group of data is to be copied in the destination information-storing medium; and copying the group of data stored in said first zone of the original information-storing medium to said second zone in the destination information-storing medium.

2. A method as recited in claim 1, wherein said attribute of said second zone in the destination information-storing medium is changed from said read-out attribute information of the original information-storing medium.

3. A method as recited in claim 1, wherein the original information-storing medium is a magneto-optical disk.

4. A method as recited in claim 1, wherein the destination information-storing medium is a magneto-optical disk.

5. A method as recited in claim 1, further comprising a step of reading out attribute information of said second zone prior to copying said attribute information read out from said first zone of said original information storing medium; and a step of determining whether said attribute information read out from said second zone of said destination information storing medium specifies said second zone as a ROM area or a RAM area;

wherein copying of data to said second zone is permitted only if said attribute information read out from said second zone of said destination information storing medium specifies said second zone as a RAM area.

6. A method to prevent inadvertent overwriting of data copied from an original information-storing medium into a destination information-storing medium, each of these information-storing media having a disk for storing information, comprising the steps of:

reading out data stored in the original information-storing medium as well as attribute information of a region storing the data, said attribute information indicating whether said region is a ROM area or a RAM area and said attribute information being provided in an area out of a user area, wherein at least one of a plurality of such regions in the original information-storing medium has said attribute information indicating the ROM area; and copying the data and the attribute information to the destination information-storing medium.

7. A method as recited in claim 6, wherein said attribute information of said region in the destination information-storing medium is changed from said read-out attribute information of the original information-storing medium.

8. A method as recited in claim 6, further comprising a step of reading out attribute information of a second zone of said destination information-storing medium prior to copying said attribute information read out from a first zone of said original information-storing medium; and a step of determining whether said attribute information read out from said second zone specifies said second zone as a ROM area or a RAM area;

wherein copying of data to said second zone is permitted only if said attribute information read out from said second zone specifies said second zone as a RAM area.

9. An apparatus for copying an information-storing medium, the information-storing medium having a disk for storing information, comprising:

means for reading attribute information of at least one first zone storing a group of data, said attribute information indicating whether said zone is a ROM area or a RAM area and being provided in an area out of a user area, wherein at least one of said first zones in the original information-storing medium has said attribute information indicating a ROM area;

means for copying said attribute information to a second zone to which the group of data is to be copied; and means for copying the group of data stored in the first zone in the original information-storing medium to said second zone in the destination information-storing medium.

10. An apparatus as recited in claim 9, further comprising:

means for reading out attribute information of said second zone prior to copying said attribute information read out from said first zone; and means for determining whether said attribute information read out from said second zone specifies said second zone as a ROM area or a RAM area;

wherein copying of data to said second zone is permitted only if said attribute information read out from said second zone specifies said second zone as a RAM area.

11. An apparatus for copying an information-storing medium, the information-storing medium having a disk for storing information, comprising:

means for reading data stored in an original information-storing medium as well as attribute information of a region storing the data, said attribute information indicating whether said region is a ROM area or a RAM area and being provided in an area out of a user area, wherein at least one of a plurality of such regions in the original information-storing medium has said attribute information indicating the ROM area; and means for copying the data and the attribute information to a destination information-storing medium.

12. An apparatus as recited in claim 11, further comprising:

means for reading out attribute information of a second zone of said destination information-storing medium prior to copying said attribute information read out from a first zone of said original information-storing medium; and means for determining whether said attribute information read out from said second zone specifies said second zone as a ROM area or a RAM area;

wherein copying of data to said second zone is permitted only if said attribute information read out from said second zone specifies said second zone as a RAM area.

13. A method for copying data which prevents inadvertent overwriting of data from an original information-storing medium having at least a region specified by attribute information indicating a ROM area into a destination information-storing medium, each of these information-storing media having a disk for storing information, said method comprising the steps of:

reading out attribute information of a destination zone of a storage medium, said attribute information specifying said destination zone as one of a RAM area and a ROM area;

returning an error message if said attribute information of said destination zone specifies said destination zone as a ROM area; and reading out data from a target zone if said attribute information of said destination zone specifies said destination zone as a RAM area, and copying said data to said destination zone.

14. A method as recited in claim 13, wherein said step of reading out data from said target zone further includes a step of reading out attribute information of said target zone, and a step of copying attribute information of said target zone to said destination zone.

15. A method as recited in claim 13, further comprising a step of changing said attribute information of said destination zone to specify a ROM area.

16. An apparatus for copying data from a target zone in an original information-storing medium having at least a region specified by attribute information indicating a ROM area, the apparatus preventing data inadvertent overwriting of data stored on a destination zone of a storage medium, the storage medium having a disk for storing information, said apparatus comprising:

means for reading out attribute information of a destination zone of a storage medium, said attribute information specifying said destination zone as one of a RAM area and a ROM area;

means for returning an error message if said attribute information of said destination zone specifies said destination zone as a ROM area; and means for reading out data from said target zone if said attribute information of said destination zone specifies said destination zone as a RAM area, and copying said data to said destination zone.

17. An apparatus as recited in claim 16, wherein said means for reading out data from said target zone includes means for reading out attribute information of said target zone, and a step of copying attribute information of said target zone to said destination zone.

18. An apparatus as recited in claim 16, further comprising means for changing said attribute information of said destination zone to specify a ROM area.

* * * * *

UNITED STATES PATENT AND TRADEMARK OFFICE
CERTIFICATE OF CORRECTION

PATENT NO. : 6,289,423 B1
DATED : September 11, 2001
INVENTOR(S) : Koji Ozaki et al.

It is certified that error appears in the above-identified patent and that said Letters Patent is hereby corrected as shown below:

Title page,
The title page showing the illustrative figure should be deleted and substitute therefore the attached title page.

Drawings,
Figure1 should be deleted and substitute therefore the corrected Figure 1, as shown on the attached page.

UNITED STATES PATENT AND TRADEMARK OFFICE
CERTIFICATE OF CORRECTION

PATENT NO. : 6,289,423 B1  Page 2 of 3
DATED : September 11, 2001
INVENTOR(S) : Koji Ozaki et al.

It is certified that error appears in the above-identified patent and that said Letters Patent is hereby corrected as shown below:

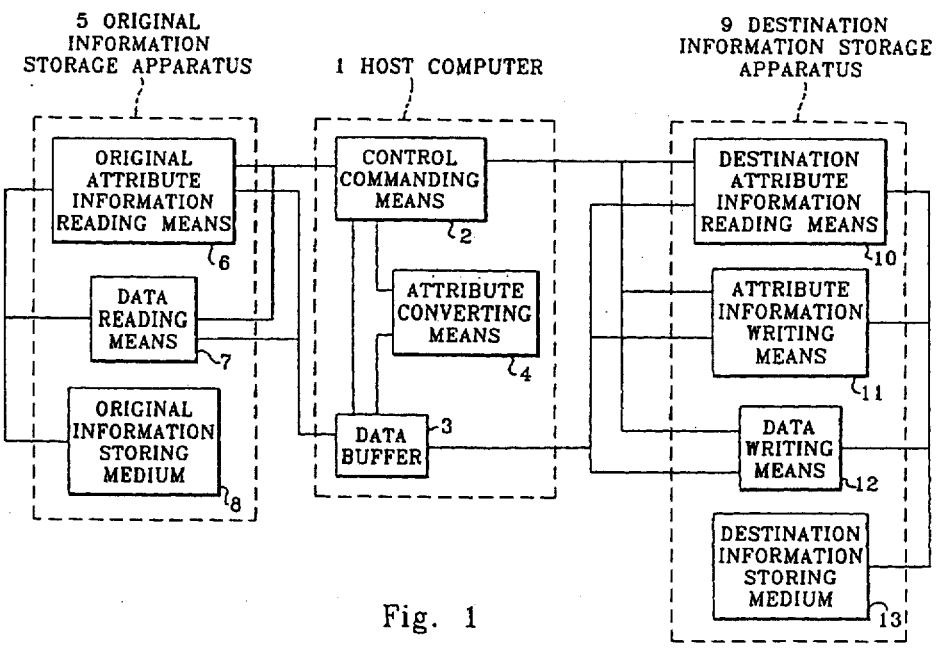

Fig. 1

Signed and Sealed this

Fourteenth Day of May, 2002

Attest:

Attesting Officer

JAMES E. ROGAN
Director of the United States Patent and Trademark Office

(12) United States Patent
Ozaki et al.

(10) Patent No.: US 6,289,423 B1
(45) Date of Patent: *Sep. 11, 2001

(54) METHOD AND APPARATUS FOR PROVIDING SELECTIVE WRITE PROTECT REGIONS IN A STORAGE MEDIUM

(75) Inventors: Koji Ozaki, Osaka; Yasumasa Yoshida, Kobe, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,978

(22) Filed: Nov. 25, 1997

(30) Foreign Application Priority Data

Dec. 9, 1996 (JP) .................................. 8-328419

(51) Int. Cl.$^7$ .......................... G06F 12/00; G11B 7/24
(52) U.S. Cl. ................... 711/163; 711/161; 711/102; 369/275.3
(58) Field of Search ...................... 711/100, 163, 711/101, 104, 103, 102, 154, 161, 162; 714/13, 10; 369/275.3; 360/8; 710/68

(56) References Cited

U.S. PATENT DOCUMENTS

| | | | |
|---|---|---|---|
| 5,056,009 | * | 10/1991 | Mizuta ........................... 711/163 |
| 5,524,205 | * | 6/1996 | Lomet et al. .................... 714/16 |
| 5,774,742 | * | 6/1998 | Nakamura et al. ............... 710/8 |
| 5,799,141 | * | 8/1998 | Galipeau et al. ................ 714/13 |
| 5,805,932 | * | 9/1998 | Kawashima et al. ............. 710/68 |
| 5,813,010 | * | 9/1998 | Kurano et al. ................... 707/100 |
| 5,832,088 | * | 11/1998 | Nakajima et al. ................ 380/22 |
| 5,878,020 | * | 3/1999 | Takahashi ...................... 369/275.3 |
| 5,881,287 | * | 3/1999 | Mast .............................. 395/701 |
| 5,894,588 | * | 4/1999 | Kawashima et al. ............. 360/8 |
| 5,930,825 | * | 7/1999 | Nakashima et al. .............. 711/163 |

* cited by examiner

Primary Examiner—B. James Peikari
Assistant Examiner—Brian R. Peugh
(74) Attorney, Agent, or Firm—Greer, Burns & Crain, Ltd.

(57) ABSTRACT

A method and apparatus to control copying of a group of data stored in an original information-storing medium into a destination information-storing medium. The method includes a step of reading attribute information of a first zone storing the group of data, where the attribute information indicates whether the zone is a ROM area or a RAM area, and a step of copying the attribute information to a second zone to which the group of data is to be copied. The method further includes a step of copying the group of data stored in the said first zone in the original information-storing medium to the second zone in the destination information-storing medium.

18 Claims, 9 Drawing Sheets